United States Patent
Ratcliff et al.

(10) Patent No.: US 6,778,540 B1
(45) Date of Patent: Aug. 17, 2004

(54) FACILITY FOR FORWARDING DATA FROM A NETWORK ADAPTER TO A ROUTER PARTITION WITHOUT INTERNET PROTOCOL (IP) PROCESSING

(75) Inventors: Bruce H. Ratcliff, Red Hook, NY (US); Arthur J. Stagg, Raleigh, NC (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 09/583,689

(22) Filed: May 31, 2000

(51) Int. Cl.[7] .............................................. H04L 12/56
(52) U.S. Cl. ..................... 370/401; 370/389; 709/220
(58) Field of Search ................................ 370/252–254, 370/351–352, 400–402, 390–392, 389, 395.1, 399, 395.5, 395.52, 395.54, 463–466, 469; 709/220, 221, 222, 223, 226–228, 236–238

(56) References Cited

U.S. PATENT DOCUMENTS

| | | | |
|---|---|---|---|
| 5,309,437 A | * | 5/1994 | Perlman et al. ............. 370/401 |
| 5,796,740 A | * | 8/1998 | Perlman et al. ............. 370/401 |
| 5,974,049 A | | 10/1999 | Ratcliff et al. .............. 370/401 |
| 5,987,515 A | | 11/1999 | Ratcliff et al. .............. 709/224 |
| 5,999,974 A | | 12/1999 | Ratcliff et al. .............. 709/224 |
| 6,003,080 A | | 12/1999 | Ratcliff et al. .............. 709/224 |
| 6,006,261 A | | 12/1999 | Ratcliff et al. .............. 709/224 |
| 6,330,615 B1 | * | 12/2001 | Gioquindo et al. ......... 709/236 |
| 6,397,260 B1 | * | 5/2002 | Wils et al. ................... 709/238 |
| 6,608,830 B1 | * | 8/2003 | Hirano et al. ............... 370/351 |
| 6,609,153 B1 | * | 8/2003 | Salkewicz .................... 370/352 |
| 6,628,649 B1 | * | 9/2003 | Raj et al. .................. 370/395.1 |

* cited by examiner

*Primary Examiner*—Steven H. D Nguyen
(74) *Attorney, Agent, or Firm*—Floyd A. Gonzalez, Esq.; Lily Neff, Esq.; Heslin Rothenberg Farley & Mesiti P.C.

(57) ABSTRACT

A facility is provided to allow for dynamic configuration of data routing between TCP/IP stacks of multiple partitions of a multi-partition processing system and a network adapter such as a local area network (LAN) gateway for the multi-partition processing system. The facility includes a command for automatically providing the network adapter with information that a particular partition of the processing system is to function as a router; and using the information at the network adapter to forward data received across the network to the partition when the data is to an unregistered HOME internet protocol (IP) address. The forwarding of data to the router partition occurs without any conventional IP processing.

34 Claims, 7 Drawing Sheets fig. 1
(PRIOR ART)

fig. 2
(PRIOR ART)

fig. 3 fig. 4 fig. 5 fig. 6 fig. 7

FACILITY FOR FORWARDING DATA FROM A NETWORK ADAPTER TO A ROUTER PARTITION WITHOUT INTERNET PROTOCOL (IP) PROCESSING

CROSS-REFERENCE TO RELATED APPLICATIONS

This application contains subject matter which is related to the subject matter of the following patents and applications, each of which is assigned to the same assignee as this application. Each of the below-listed patents and applications is hereby incorporated herein by reference in its entirety:

"INTERNET PROTOCOL ASSISTS FOR HIGH PERFORMANCE LAN CONNECTIONS," by Ratcliff et al., U.S. Pat. Pat. No. 5,999,974, issued Dec. 7, 1999;

"INTERNET PROTOCOL ASSISTS USING MULTI-PATH CHANNEL PROTOCOL," by Ratcliff et al., U.S. Pat. Pat. No. 6,003,080, issued Dec. 14, 1999;

"INTERNET PROTOCOL ASSISTS USING MULTI-PATH CHANNEL PROTOCOL," by Ratcliff et al., U.S. Pat. Pat. No. 6,006,261, issued Dec. 21, 1999;

"INTERNET PROTOCOL ASSISTS USING MULTI-PATH CHANNEL PROTOCOL," by Ratcliff et al., U.S. Pat. Pat. No. 5,987,515, issued Nov. 16, 1999;

"INTERNET PROTOCOL ASSISTS FOR HIGH PERFORMANCE LAN CONNECTIONS," by Ratcliff et al., U.S. Pat. Pat. No. 5,974,049, issued Oct. 26, 1999;

"METHOD FOR NETWORK COMMUNICATIONS OF MULTIPLE PARTITIONS EMPLOYING HOST-NETWORK INTERFACE," by Gioquindo et al., U.S. Pat. Pat. No. 6,330,615, issued Dec. 11, 2001;

"SYSTEM FOR NETWORK COMMUNICATIONS OF MULTIPLE PARTITIONS EMPLOYING HOST-NETWORK INTERFACE," by Gioquindo et al., U.S. Pat. Pat. No. 6,330,616, issued Dec. 11, 2001;

"NETWORK COMMUNICATIONS OF MULTIPLE PARTITIONS EMPLOYING HOST-NETWORK INTERFACE," by Gioquindo et al., U.S. Pat. Pat. No. 6,334,154, issued Dec. 25, 2001; and "FACILITY FOR RETRIEVING DATA FROM A NETWORK ADAPTER HAVING A SHARED ADDRESS RESOLUTION TABLE," by Ratcliff et al., Ser. No. 09/584,524, filed May 31, 2000.

TECHNICAL FIELD

The present invention relates in general to network communications of processing systems. The invention relates to techniques for effecting communications between a network and multiple partitions of a data processing system employing a host-network interface. More particularly, the invention relates to a facility for forwarding data received across a first network to a partition of a multi-partition system for routing to a second network, wherein the data forwarding occurs without internet protocol (IP) processing between the partition and the network adapter coupling the partition to the first network.

BACKGROUND OF THE INVENTION

Mainframe class data processing systems have hardware and software facilities that enable partitioning thereof. Such processing systems may be subdivided into multiple partitions whereby a user of a partition, or software executing in a partition, has the impression that the processing system is exclusively used by that application. Each partition has the appearance of being a separate and distinct processing system and may even run its own multi-tasking and multi-user operating systems independent from each other partition. An IBM Enterprise Systems Architecture ("ESA")/390 Mainframe Computer is an example of one such partitionable mainframe class data processing system. Partitioning thereof is described in, for example, various publications by International Business Machines Corporation, including "IBM ESA/390 Principles of Operation", IBM Publication No. SA22-7201-02, December 1994, and in the "IBM Enterprise System/9000 Processor Resource/Systems Manager Planning Guide", IBM Publication No. GA22-7123-11 (April 1994), which are both hereby incorporated herein by reference in their entirety.

Figure 1:
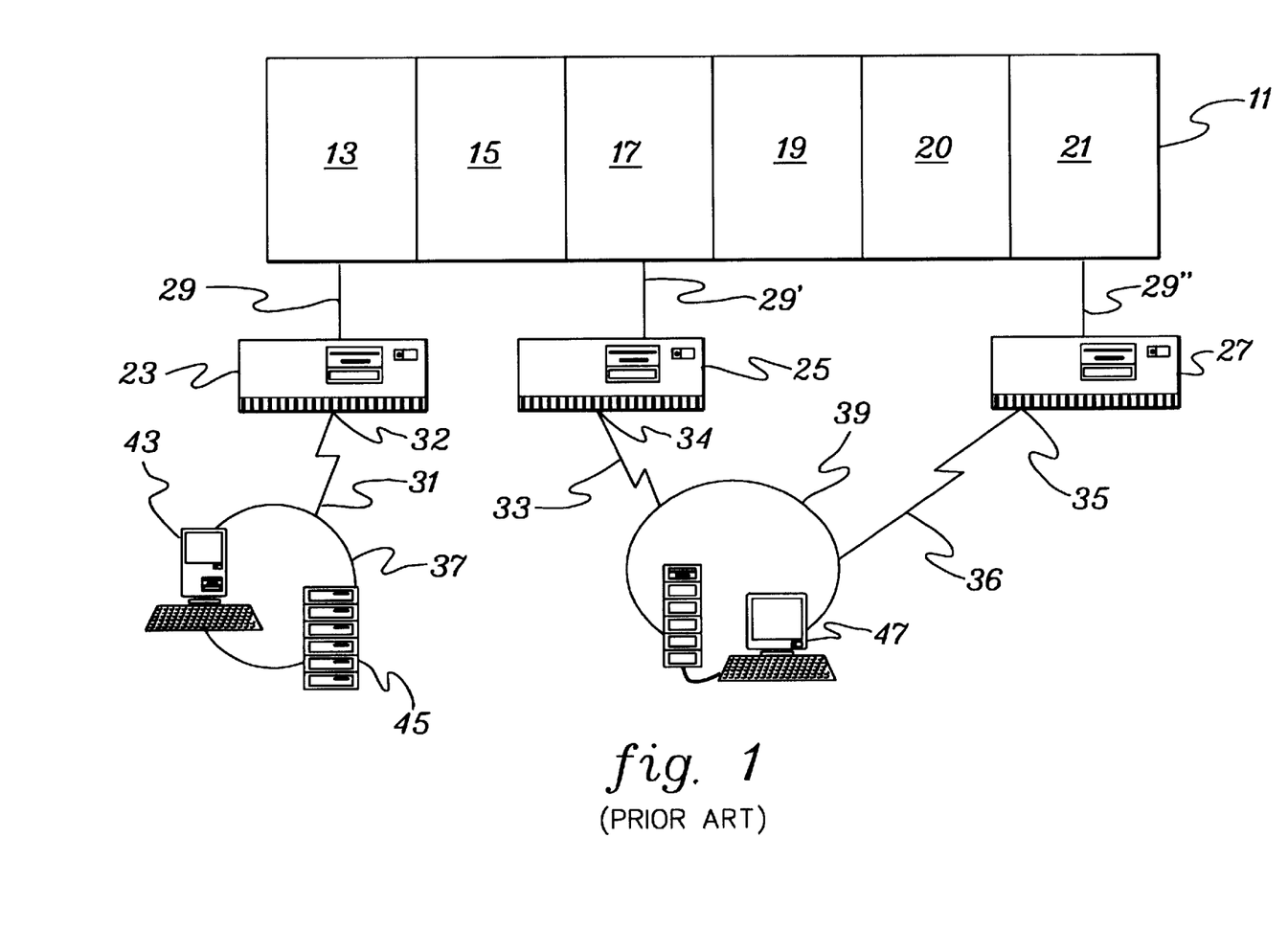
FIG. 1 is a system diagram of a conventional network connected partitionable mainframe class data processing system.

Software executing in individual partitions within the mainframe class data processing system may require a network connection such as a local area network ("LAN") connection or a wide area network ("WAN") connection. This may be used to facilitate connectivity to users, or to application programs used in, for example, a client-server processing environment. Shown in FIG. 1 is a conventional configuration used to connect individual partitions, including the software running therein, to a LAN. The configuration includes a processing system 11 that has partitions 13, 15, 17, 19, 20 and 21.

Network connectivity for each partition of system 11 of FIG. 1 is achieved using separate network interfaces for each partition. For example, partition 13 is conventionally connected through channel connection 29 to an IBM 3172 Interconnect Controller 23 (with 8232 Channel Interface Attachment) that has, for example, a token ring or Ethernet LAN port 32 attached to LAN 37 thereby providing LAN connection 31. Network connectivity is accordingly directly provided between partition 13 and computers 43 and 45 on LAN 37 through the IBM 3172 23. However, according to conventional techniques, this configuration has no other direct logical or physical connections from any of the other partitions to LAN 37. To further note, each application within partition 23 must communicate with a different network port on IBM 3172 23. The IBM 3172 (having internal 8232 Channel Interface Attachment), is described in a publication entitled "8232 LAN Channel Station", Apr. 15, 1998, IBM Publication No. ZZ25-8577-0, that is incorporated herein by reference in its entirety.

The conventional software executing on IBM 3172s restricts direct logical connectivity to being between a single partition and its corresponding LAN. Thus, to facilitate direct connectivity from a computer 47 on a LAN 39 to both partition 17 and 21, multiple IBM 3172s would traditionally be used. Partition 17 is coupled to LAN 35 via channel connection 29', IBM 3172 25 and LAN port 34 thereby establishing LAN connection 33. Similarly, partition 21 is coupled to LAN 39 via channel connection 29", IBM 3172 27, and LAN port 35 thereby establishing LAN connection 36.

An enhanced network interface for a mainframe class data processing system having multiple partitions and a port to a network is described in commonly assigned U.S. Pat. Pat. No. 5,740,438, which is hereby incorporated herein by reference in its entirety. Briefly summarized, this patent describes establishing a table which defines communications paths between the port to the network and at least two partitions of the multiple partitions. More specifically, each partition has at least one application executing therewithin and the communications paths are defined thereto. Data frames are passed between the network and the applications within the partitions through the port to the network and along the communications paths defined in the table such that the network communications is effected.

Figure 2:
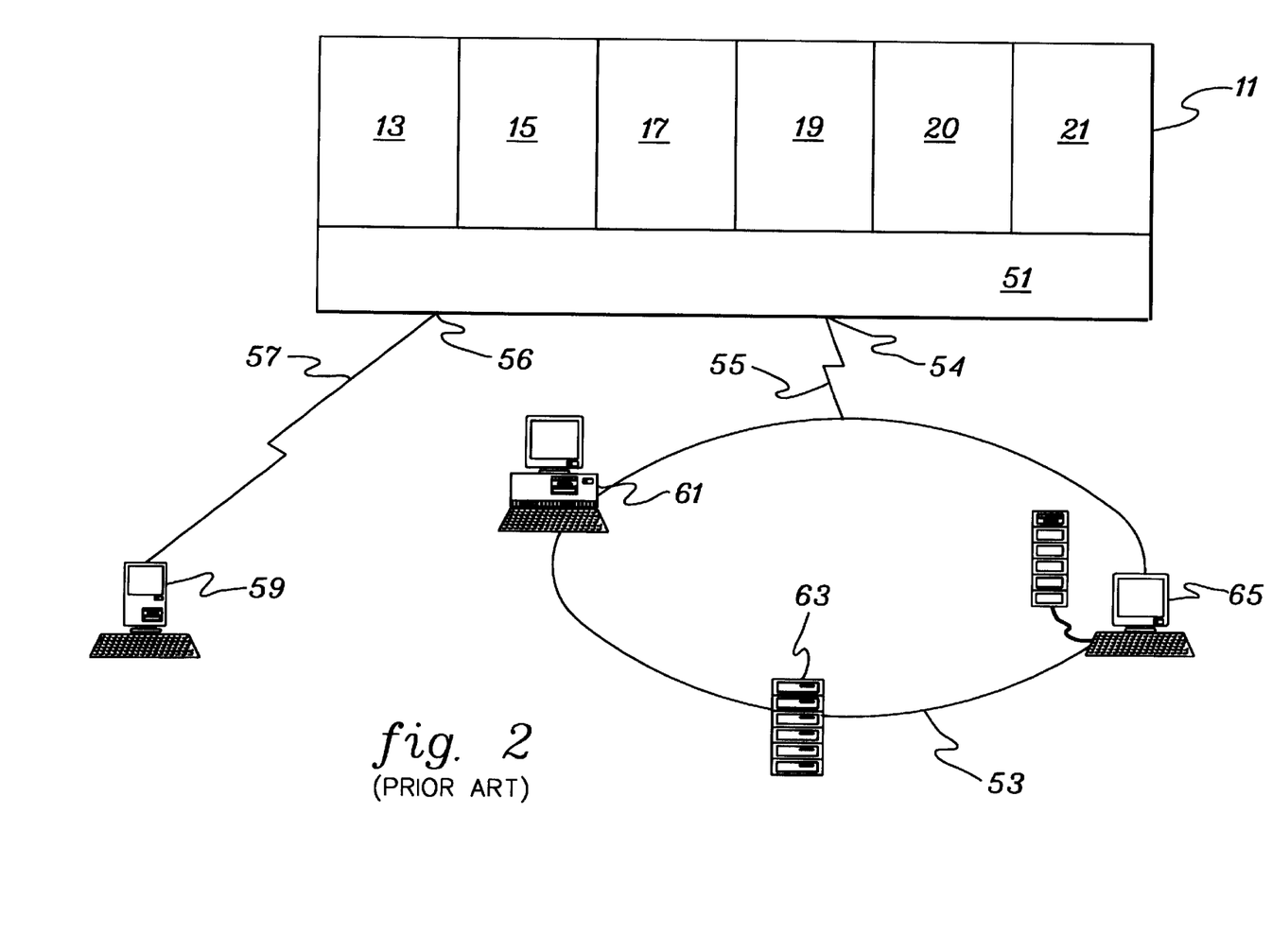
FIG. 2 is a system diagram of an alternate embodiment of a network connected partitionable mainframe class data processing system.

One embodiment of the network interface approach of U.S. Pat. Pat. No. 5,740,438 is depicted in FIG. 2. Shown is a partitionable mainframe class data processing system 11 (e.g., an IBM Enterprise System/9000) having an integral host-to-network interface ("HNI") 51 that facilitates a LAN connection 55 from multiple partitions 13, 15, 17, 19, 20 and 21 to LAN 53 through LAN port 54. Each application in each partition may directly communicate with computers 61, 63 and 65 on LAN 53 through the single host-to-network interface 51 and single LAN port 54. The LAN shown is a token ring LAN; however, the system is equally applicable to other types of LANs such as, for example, Ethernet and Fiber Distributed Data Interface ("FDDI"). Further, the host-to-network interface may support multiple network connections by way of multiple network ports. For example, a WAN connection 57 comprising, for example, a Peer-to-Peer Protocol ("PPP") connection may be established to a computer 59 through WAN port 56. Any mix of LAN and WAN connections among multiple ports of host-to-network interface 51 is possible.

The host-to-network connectivity techniques described above have certain limitations, particularly in an Ethernet environment where two different frame types are possible, i.e., Ethernet DIX and Ethernet 802.3. For client/server systems, Transmission Control Protocol (TCP)/Internet Protocol (IP) has become the leading protocol for network communications. Using Ethernet, when a client application running over TCP/IP wants to communicate with a server application, the application must specify one of the two existing Ethernet frame formats. The frame format must also be known by the server machine in order for the TCP/IP connection to be established and any data transfer to occur. Conventionally, in order to make sure that the client and server communicate using the same Ethernet frame formats, both the client and server must specify the specific frame format to be used in their appropriate configuration files. If the configuration files do not match, then the client/server application will not work properly.

The most common server TCP/IP environment today has the complete TCP/IP functionality on one platform. For example, reference "TCP/IP Tutorial and Technical Overview," IBM Document No. GG24-3376-03 (December 1992). In this environment, one device driver exists in each partition for each LAN connection. Each device driver can specify a different Ethernet frame format, but will not support both frame formats. Thus, a different device driver is used for each of the two frame formats. In operation, a dedicated device driver of a partition of the host system takes care of providing both channel headers and media or LAN headers necessary for transmission of an IP packet across the LAN to a client coupled thereto.

With the above as background, the present invention is directed to enhancements to the state-of-the-art of network communications of multiple partitions employing a host-network interface, and in particular, to enhanced techniques for routing data from a first network to a second via a designated router partition of a multi-partition processing system coupled to both networks.

DISCLOSURE OF THE INVENTION

To briefly summarize, the present invention comprises in one aspect a method of routing data in a communications environment which includes at least one network and a processing system coupled thereto across a system adapter. The processing system has multiple logical partitions. Within this environment, the method includes: providing the network adapter with information that a partition of the processing system is to function as a router; and using the information at the network adapter to forward data received across the network to the partition, wherein the forwarding occurs without internet protocol (IP) processing. More particularly, the forwarding occurs automatically from the network adapter without the network adapter building a router table to exchange routing information before the data is forwarded to the partition. Any data received at the network router not destined for a HOME IP address registered to the adapter is forwarded to the partition of the processing system flagged to function as router.

Systems and program storage devices corresponding to the above-summarized methods are also described and claimed herein.

Presented herein is a facility which employs new command functions referred to as "Set Routing" functions. Based on user input, the network adapter or gateway is configured with a variety of IP addresses that can add extended capabilities to the gateway to behave like a "router" without requiring internet protocol (IP) processing to forward unregistered packet of data. These configuration capabilities allow a server system to manage and tolerate network changes on a real time basis. This facility can be used for server redundancy and for server-to-server and network performance enhancements. The facility of the present invention allows the adapter to automatically route unknown inbound frames of data to a designated partition which is to function as router in a multi-partition environment.

The ability to integrate and manage heterogenous systems is important as the business world moves stronger into e-business. With today's versions of gateways, the extended capabilities of the present invention increases the overall robustness of the communications network. The ability to dynamically monitor alterations, additions and deletions from the communications functions supported by the host and make necessary modifications in the system to reflect these changes is significant as this "gateway" function is moved into the main system to act like an integrated internet/e-business machine. Further, a facility in accordance with the present invention can operate in conjunction with a variety of systems and be used in a heterogenous environment.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As noted, a common communications protocol for the mainframe environment today is the Transmission Control Protocol/Internet Protocol (TCP/IP). TCP/IP communications is described in, for example, the above-noted document entitled "TCP/IP Tutorial and Technical Overview," IBM Document No. GG24-3376-03, published December, 1992, which is hereby incorporated herein by reference in its entirety. The present invention can be implemented in a system employing, e.g., TCP/IP communications with certain TCP/IP functionality being migrated from the host system to a second platform, herein referred to as the host-network interface.

Figure 3:
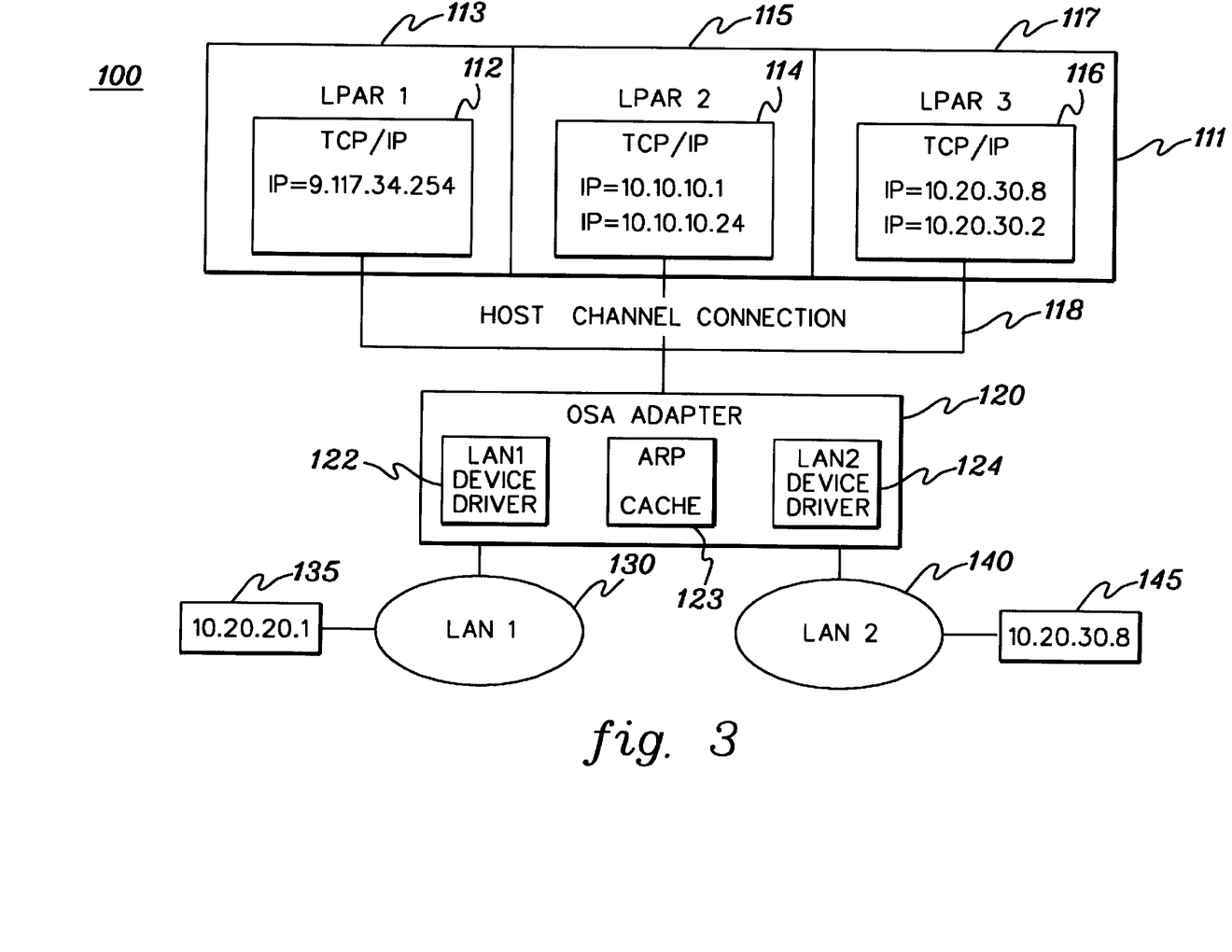
FIG. 3 is a system diagram of one embodiment of a network connected partitionable mainframe class data processing system showing a network adapter (or gateway) to employ facilities in accordance with the present invention.

FIG. 3 depicts one embodiment of a communications network 100 wherein, for instance, an IBM S/390 host system 111 is coupled to multiple local area networks across a host-network interface which comprises a host channel connection 118 and a communications adapter, such as an IBM Open Systems Adapter (OSA) 120. The OSA 120 may be platform channel attached to or integrated with the mainframe environment. In the OSA environment, the TCP/IP address resolution protocol (ARP) function has been migrated to the OSA platform 120.

The OSA adapter has the capability of supporting any number of different TCP/IP connections through a common network device driver, such as LAN 1 device driver 122 and LAN 2 device driver 124. Further, the HOST applications are no longer required to know anything about the LAN or wide area network (WAN) media over which they are communicating.

FIG. 3 shows three separate HOST logical partitions (LPARs) or partitions. As is well known, each LPAR functions as its own separate entity, with each logical partition (LPAR) of the host system 111 being viewed as a completely separate entity. The TCP/IP box within each LPAR defines a unique TCP/IP stack 112, 114, 116, which can function independently of the others. The IP fields are the unique IP addresses defined for each TCP/IP stack. A TCP/IP stack can have one or more IP addresses defined.

Each logical partition LPAR 1 113, LPAR 2 115, LPAR 3 117, couples through a Host Channel Connection 118 to a communications adapter 120, such as IBM's Open Systems Adapter (OSA). The OSA adapter, which has a connection to each of the TCP/IP stacks, is an integrated channel attached LAN adapter which does not contain its own TCP/IP stack. The Host Channel Connection 118 comprises as one example an IBM Enterprise System Connection ("ESCON") channel connector. The LAN device drivers 122, 124 and the Address Resolution Protocol cache 123 are contained in the OSA adapter 120. This is different from other channel attached adapters which do not contain the IP functionality. For background on an Address Resolution Protocol (ARP) cache or table, reference a textbook by W. Richard Stevens entitled *TCP/IP Illustrated*, published by Addison-Wesley, Volume 1 (1994), the entirety of which is hereby incorporated herein by reference.

Multiple logical partitions are shown in FIG. 3 as sharing a common network device driver 122 or 124 for accessing network 130, 140, respectively, coupled to the host system 111. By way of example, OSA adapter 120 is shown connected to two different LANs, i.e., LAN 1 130 and LAN 2 140. These LANs can be different media types, e.g., Fiber Distributed Data Interface ("FDDI"), token ring, or Ethernet. Further, each LAN 130, 140 includes a representative client platform 135 & 145. The numbers depicted in the client platforms are representative of IP addresses used in accessing the particular platforms.

Media headers are stored in the ARP table (or ARP cache) employed by the communications adapter. (As used herein, a "media header" refers to the MAC (Media Access Control) header, and is also referred to as a LAN header or WAN header.) For example, upon receipt of an ARP response from a client to a broadcast ARP request, the LAN header, which defines the Ethernet frame format of the client machine, is obtained from the response and stored into the ARP table in a manner which will be straightforward to one of ordinary skill in the art. The ARP table will thus contain two headers, one for ARP packets and one for IP packets.

By storing the media header in the ARP table, the OSA adapter can then subsequently append this header to every IP datagram being sent to that particular client platform without having to construct a new media header each time. For Ethernet DIX packets, all the fields in the LAN header are constant, while for Ethernet 802.3, all the fields are constant except for the Frame Length field. This field must be changed to the packet length for each packet transmitted.

Further, media headers can be predetermined by configuring the communications adapter to monitor ARP requests received from the network. Each incoming request will also identify the Ethernet frame type being used by the source client. From such a request, the LAN headers can be obtained and pre-stored in the ARP cache for future use with an IP request destined for that client platform as described above. Advantageously, by so pre-storing the LAN headers, the header does not have to be constructed for each IP datagram being transmitted from the adapter and the host system is freed of any responsibility for designating a client's Ethernet frame format.

Figure 4:
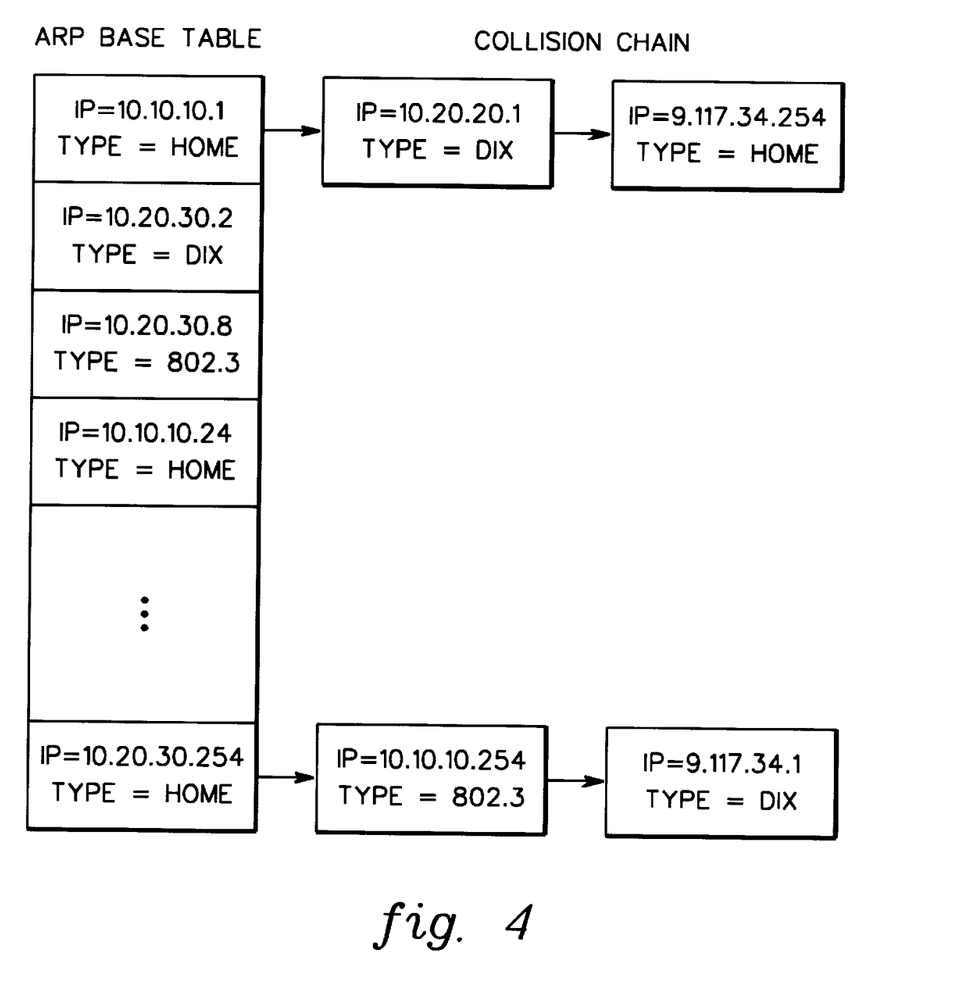
FIG. 4 depicts one embodiment of an address resolution protocol (ARP) cache implemented within a host-network interface such as depicted in FIG. 3.

Another aspect of the gateway device comprises designating and saving "HOME" IP addresses within the communications adapter, e.g., within the ARP cache. FIG. 4 presents an example of the possible formats of the ARP entries on an OSA adapter. The figure depicts two tables, namely, an ARP Base Table and an ARP Collision Chain. To find a proper entry in the OSA ARP table, an IP address is traditionally first hashed to compute a one byte index into the ARP Base Table, which may by way of example comprise 256 bytes. Since it is possible for two IP addresses to "hash" to the same index, the ARP Collision Table is needed to chain these additional entries to the ARP Base Table. The IP numbers in the two tables comprise examples of IP addresses for the application used by the particular networking protocol as will be apparent to one of ordinary skill in the art. The examples agree in part with the IP addresses provided in FIG. 3.

The information in the ARP tables can be obtained from the TCP/IP stacks at initialization time and from the LAN as ARP requests/responses received from the network. At initialization time, each Host TCP/IP stack is configured to register its HOME IP addresses with the OSA adapter in a manner apparent to one skilled in the art. The "HOME" addresses are those which are recognized as local IP addresses by the specific stack. These entities are marked as HOME entries in the ARP cache. The entries are unique from the ARP entries for the LAN because they do not contain the specific LAN frame type which is to be used in transmitting a packet. If needed, the frame format for these entries is dynamically determined as described above by the client or server in the network which sends packets to the OSA adapter.

The HOME IP addresses conventionally mark the IP addresses to which OSA will respond when receiving an ARP request from the LAN. The format of the ARP response which OSA returns is the same as the format of the ARP request which OSA receives. The entire MAC header used to send back an ARP response is thus also saved in the ARP tables on the OSA adapter. This MAC header is then appended to any IP datagrams received from the Host which are destined for the matching IP address.

The HOME entries can serve other purposes. These entries can be used to route packets from a first logical partition (LPAR) to a second LPAR of the host system without going onto a network. When a packet is received from the Host, the destination IP address is "looked up" in the ARP tables of the host-network interface. If an entry is found and it is marked as a HOME entry, then the IP packet is routed directly to the LPAR owning that address. Since the packet is not sent out onto a network, no media or network header needs to be constructed. Further details of this LPAR-to-LPAR communications capability are described in the above-incorporated, commonly assigned United States Patent Applications entitled "Method for Network Communications of Multiple Partitions Employing Host-Network Interface," "System for Network Communications of Multiple Partitions Employing Host-Network Interface," and "Network Communications of Multiple Partitions Employing Host-Network Interface."

To summarize, the present invention builds upon certain proprietary concepts described in the initially-incorporated patents and applications. For example, a method of dynamically providing a host system with information about functions supported by a communications platform provided in a computing network environment is assumed. The computing network environment is also provided with a gateway device (e.g., IBM's OSA adapter) that is electronically connected to at least one initiating host and at least one receiving host, besides the associated communication platform. During an initialization step, functions commercially available on communication platforms are inputted in a special function table. The particular associated platform is queried and the functions provided in the particular computing environment are determined and inputted also into the function table. Alterations and modifications to the availability of old functions or addition of new functions are also monitored and inputted into the table. In this manner, any host connected to the gateway device can obtain a list of all available functions supported by the communication platform at any time and, if desired, a host can choose a function from this list of available functions.

The present invention describes an enhanced function referred to herein as a "set routing" function. Based on user input, the gateway is configured with a variety of IP addresses that can add extended capabilities to the gateway to behave like a "router". These configuration capabilities allow a server to manage and tolerate LAN changes on a real time basis. This function can be used for server redundancy and for server-to-server and LAN performance reasons.

As noted, the OSA adapter is shared across any number of host partitions, and any one of these partitions could function as a router to forward packets from the adapter's LAN to another LAN to which the partition is connected. The purpose of a "set routing" command is to define at the adapter a specific IP instance (i.e., partition) as a routing node. During operation, it is likely that inbound data frames will be received by the gateway (i.e., OSA adapter) destined to IP addresses that are not known to that system. These inbound frames may be routable by a TCP/IP instance known to the gateway to be the correct destination TCP/IP. In the IBM S/390 environment, there may be multiple system images, each with multiple TCP/IP instances. This presents the adapter with multiple issues, including, to which TCP/IP instance should the frames be routed, should the adapter route the frames to all known TCP/IP instances, and/or should the adapter discard the frames.

In order to resolve the above issues, key words are added herein to the TCP/IP configuration. Essentially, they provide a means for a customer to select specific instances of TCP/IP (or logical partitions) to provide a routing function for unknown inbound frames. For example, a customer may specify a primary and secondary routing TCP/IP instance, or they may elect to not specify a routing instance at all. If specified, then in one embodiment the gateway (OSA adapter) will automatically pass these frames first to the primary instance and, if a primary is not specified or available, then to a secondary routing instance. If neither primary nor secondary are specified, then the system may discard inbound frames destined for unknown IP address(es).

Table 1 below depicts one embodiment of a Set Routing Command request in accordance with the present invention, while Table 2 depicts a Set Routing Command reply in accordance with the invention. In both the request and the reply a "routing level indicator" is added to the end of the command to designate an instance as primary or secondary.

TABLE 1

| DESCRIPTION |
|---|
| Command Code |
| Initiator: |
| |
| TCP/IP initiated |
| Sequence number set by initiator |
| Return code |
| LAN Type: |
| |
| Enet |
| Relative adapter number |
| Primitive version number |
| Parameter or command count |
| Protocol version number supported for this command: |
| |
| IPv4 |
| IPv6 |
| IP assists supported |
| IP assists enabled |
| Primitive specific: |
| Routing level indicator: |
| |
| Primary |
| Secondary |

TABLE 2

DESCRIPTION

Command Code
Initiator:

TCP/IP initiated
Sequence number set by initiator
Return code
primary already defined
secondary already defined
LAN Type:

Enet
Relative adapter number
Primitive version number
Parameter or command count
Protocol version number supported for this command:

IPv4
IPv6
IP assists supported
IP assists enabled
Primitive specific:
Routing level indicator:

Primary
Secondary

The above-described Set Routing Commands can be employed to identify one or more partitions of a multi-partition environment to function as a router for all packets received at the network adapter which are destined for an unregistered IP address. The Set Routing Commands can be employed at initialization in combination with the handshake commands between the host partitions and OSA adapter described in the initially-incorporated patents and applications. Note that use of a primary and secondary router designation are simply one example of the present invention. The primary and secondary approach described herein means that unregistered packets are forwarded to the partition designated as primary router assuming availability of that partition. If, for example, the primary router partition is down, then the unregistered packets are forwarded to the secondary router partition. If both partitions are down, then in one embodiment, the unregistered packets are discarded by the adapter.

In accordance with the present invention, the gateway (or OSA adapter) functions as a mini router without the use of any routing protocols being exchanged between the gateway and router. All communications are between the multiple host partitions and the gateway (network adapter). LAN communications are not required in order to achieve forwarding of unregistered packets. The Set Routing Command request of Table 1 instructs the adapter to set a flag that will designate a particular partition (or TCP/IP) instance as, e.g., a primary router or secondary router. The Table 2 routing command reply basically informs the instance that the adapter has seen the command and accepts responsibility that that instance will be the primary or secondary partition router.

Figure 5:
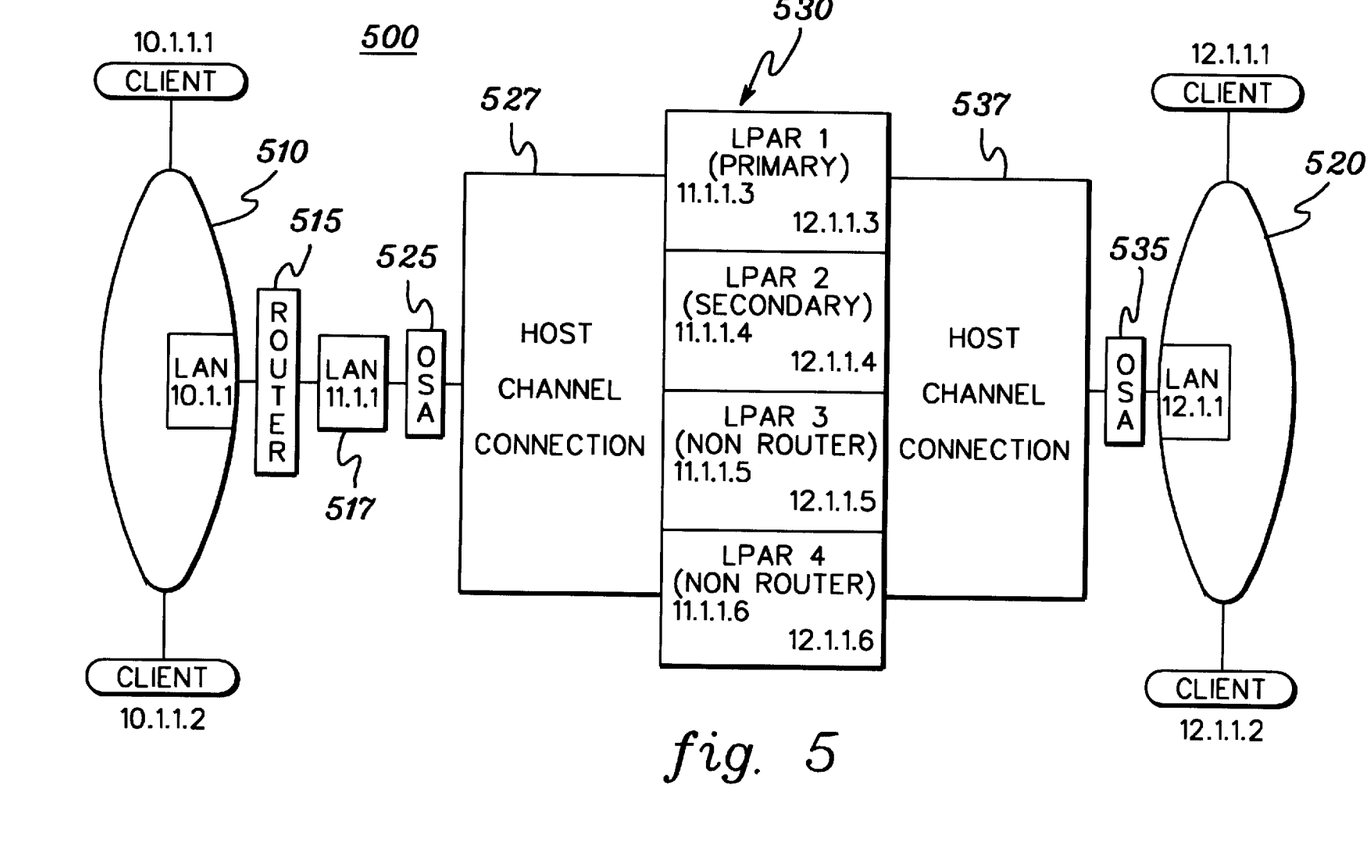
FIG. 5 depicts one embodiment of a system diagram showing a multi-partition data processing system coupled to two networks, with at least one network adapter of the processing system to employ facilities in accordance with the principles of the present invention.

FIG. 5 depicts one embodiment of a communications environment, generally denoted 500, to implement a facility in accordance with the present invention. Environment 500 includes a first LAN 510 and a second LAN 520 which are connected through a multi-partition processing system 530. LAN 510 has an IP address 10.1.1 and multiple clients 10.1.1.1 & 10.1.1.2 connected thereto, while LAN 520 has an IP address 12.1.1 and multiple clients 12.1.1.1 & 12.1.1.2 connected thereto. LAN 510 connects to a conventional router 515 which connects to another LAN 517 (having IP address 11.1.1). An OSA type network adapter 525 connects to router 515 across LAN 517. A host channel connection 527 such as described above in connection with FIG. 3 is shared by multiple partitions, labeled LPAR 1, LPAR 2, LPAR 3 & LPAR 4 of the multi-partition processing system 530. Each partition is assigned an IP address for LAN 517 (i.e., 11.1.1.3–11.1.1.6).

Multi-partition system 530 also connects to LAN 520, but in this example, directly across an OSA adapter 535 (again through a shared host channel connection 537). For this network, LPAR 1–LPAR 4 have IP addresses of 12.1.1.3–12.1.1.6, respectively. Note that because multi-partition system 530 connects to multiple networks, the logical partitions have multiple IP addresses. In this example, LPAR 1 is labeled primary router, LPAR 2 secondary router, and LPARs 3 & 4 as non-routers. LPAR 1 can be a primary router for data packets received at OSA 525 or OSA 535, or conceivably, for packets received from both OSA 525 and OSA 535. Further, one LPAR of multiple partition processing system 530 can be a primary router for one network adapter (e.g., OSA 525 or OSA 535), while another LPAR of the multi-partition processing system can be primary router for another network adapter.

In the example of FIG. 5, note that an LPAR registered as primary or secondary at OSA 525 communicates across the adapter with a router 515, while an LPAR register as primary or secondary to OSA 535 communicates across the adapter to a client of the associated network 520. Clients of network 510 communicate with router 515 which then forwards the data to the appropriate LPAR router of the multi-partitioned system 530.

Figure 6:
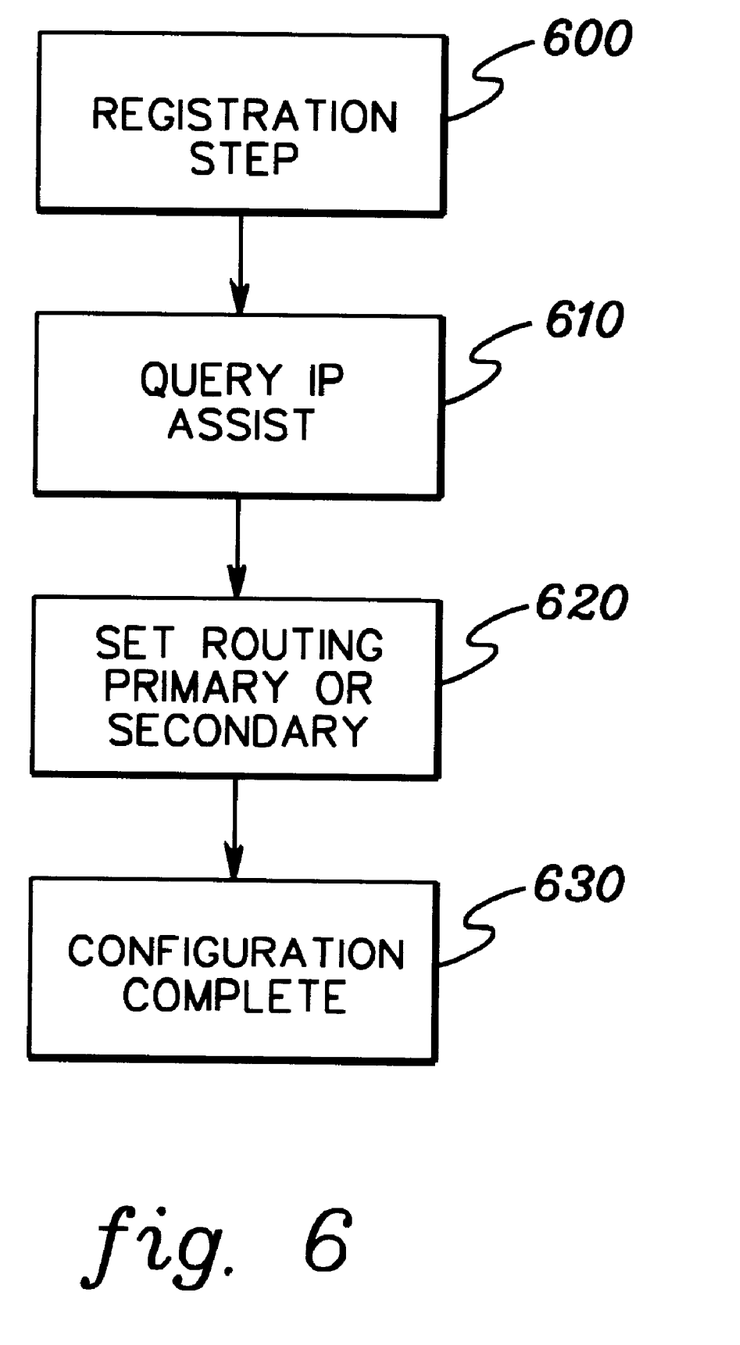
FIG. 6 is a flowchart of one embodiment of a process m for configuring data at a network adapter in accordance with the principles of the present invention.

FIG. 6 depicts one embodiment of configuration processing in accordance with the principles of the present invention. At initialization, the partitions each register a specific HOME IP address down to the LAN card (OSA adapter) as described above 600. Each HOME IP address is for a particular instance of the system, or interchangeably a particular TCP/IP stack. Next, processing performs a query IP assist 610 to determine whether the OSA card has support for various configuration parameters such as described in the above-incorporated United States Patents. To the extend relevant to the present invention, this processing step inquires whether the adapter can accept a Set Routing Command as presented herein and interpret it properly. Assuming that the adapter has this capability, then the Set Routing Command is provided to the adapter which identifies a primary and/or secondary router partition 620. In one embodiment, no set routing command is forwarded by a partition if the partition is not to act as router (see the non-router partitions of FIG. 5). Upon the adapter responding with the Set Router Command reply (see Table 2), the routing configuration is complete at the adapter 630.

Figure 7:
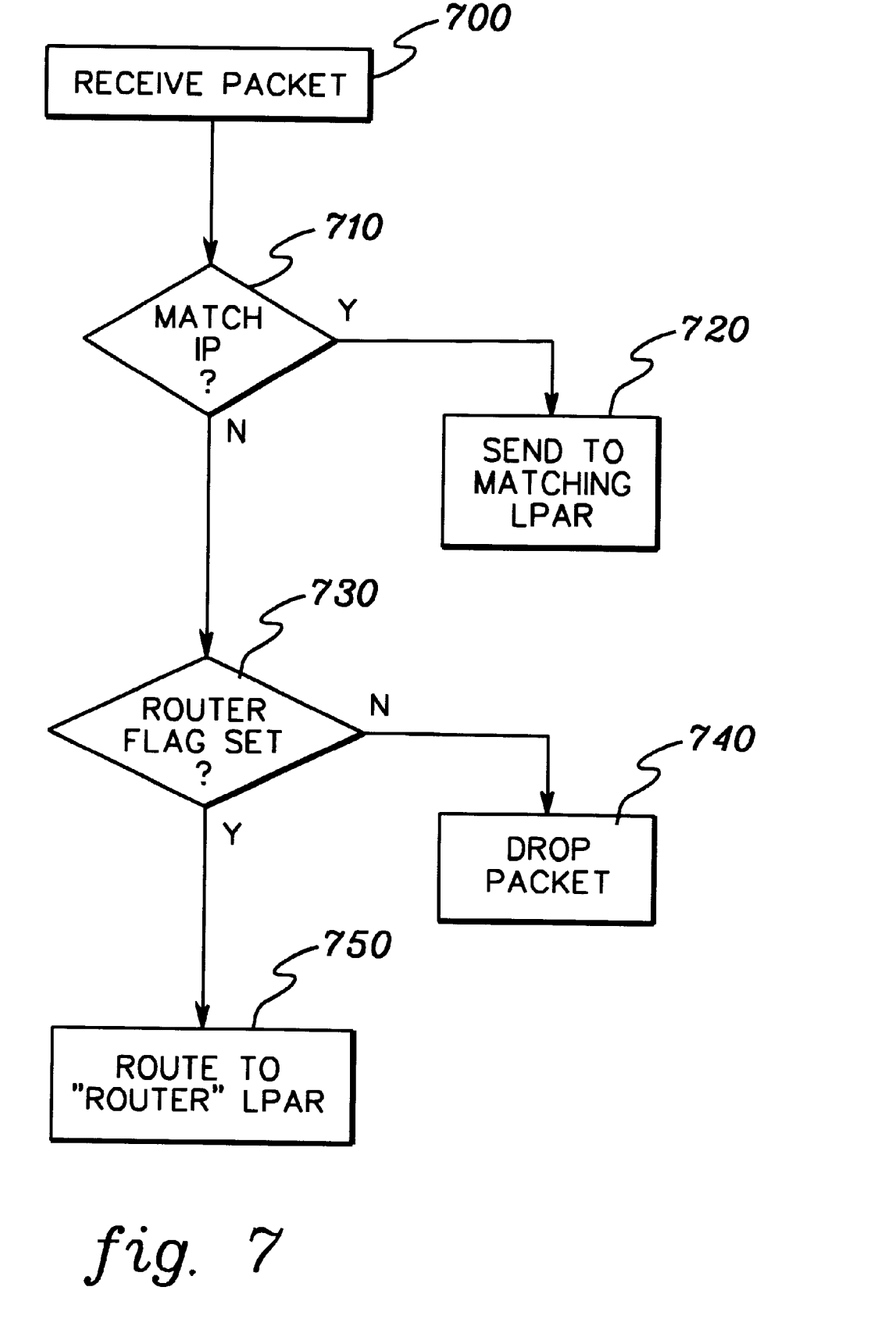
FIG. 7 is a flowchart of one embodiment of data packet processing at a network adapter having capabilities in accordance with the principles of the present invention.

FIG. 7 depicts one embodiment of packet processing once routing information is set at the adapter in accordance with the capabilities of the present invention. When a data packet is received off the network 700, the packet is examined to see if it matches a registered HOME IP address at the adapter 710. If yes, the packet is routed to the specific LPAR that has registered that HOME IP address with the adapter 720.

Where, for example, a client is forwarding a packet to an IP address on a different network through the adapter, the destination address will not be a registered HOME IP address. In this case, the adapter looks to see whether a router partition flag is set with either a primary or secondary router functioning as a "next hop" router to another network 730. If no, then the adapter simply drops the data packet 740. Assuming that a router flag has been set in accordance with this invention, then the packet is routed to the designated router LPAR 750 for forwarding on to the other network.

With the Set Router Commands, the adapter functions as a quasi-router which allows forwarding of packets to the appropriate routing partition without any IP functionality being required, i.e., without looking up routing tables, etc. Conventionally, full IP stack/protocol functionality would be required to forward unregistered packets to a router partition of a multi-partition environment. The present invention accomplishes this with a single command. The present invention avoids the exchange of routing protocols, and the only exchange of data between the adapter and the specific LPAR to function as router is the data packet itself. The present invention also provides the ability to automatically switch routing from one LPAR to another LPAR, e.g., primary router LPAR to secondary router LPAR, if one of the partitions goes down. Again, this is without a full IP forwarding agent. Thus, the present invention allows for dynamic configuration or reconfiguration of communications between the partitions and the associated adapter. No user intervention is required.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of routing data in a communications environment comprising at least one network and a processing system coupled thereto across a network adapter, said processing system having multiple partitions, said method comprising:
   providing the network adapter with information that one partition of the multiple partitions of the processing system is to function as a router, wherein the multiple partitions of the processing system couple to the at least one network across the network adapter; and
   using the information at the network adapter to automatically forward data received across the network to the one partition, wherein the forwarding occurs without internet protocol (IP) processing between the one partition and the network adapter.

2. The method of claim 1, wherein the forwarding occurs without the network adapter building a router table to exchange routing information before forwarding the data to the partition.

3. The method of claim 2, wherein the partition comprises a first partition, and wherein the providing comprises forwarding from each partition of the multiple partitions a HOME IP address for use by the adapter in forwarding data thereto, and wherein said using comprises automatically forwarding the data received across the network to the first partition when the data is not identified as destined for a HOME IP address registered to the network adapter.

4. The method of claim 3, wherein the network comprises a first network, and the communications environment includes a second network, with the first partition being coupled to both the first network and the second network and comprising a next hop router for forwarding data packets from the first network to the second network.

5. The method of claim 1, wherein said providing comprises employing a Set Router command from the partition to set a routing flag at the network adapter indicating that the partition of the processing system is to function as router for unregistered data packets received at the network adapter.

6. The method of claim 5, wherein said providing further comprises acknowledging back to the partition setting of the routing flag at the network adapter.

7. The method of claim 1, wherein the partition comprises a first partition, and wherein said information designates said first partition as a primary router, and said providing further comprises providing the network adapter with information that a second partition of the processing system is to function as a secondary router, wherein the secondary router is employed if the primary router fails.

8. The method of claim 1, wherein the at least one network comprises at least two networks, and wherein the partition functions as a router to route said data received across a first network to a second network of said at least two networks.

9. The method of claim 1, wherein said providing comprises providing said information from the partition to the network adapter at initialization of the processing system.

10. The method of claim 1, wherein said using comprises using the information at the network adapter to automatically forward unregistered data received across the network to the partition, wherein the automatic forwarding occurs without internet protocol (IP) processing between the partition and the network adapter.

11. The method of claim 10, wherein said providing comprises automatically communicating said information from the partition to the network adapter.

12. A system for routing data in a communications environment comprising at least one network and a processing system coupled thereto across a network adapter, said processing system having multiple partitions, said system comprising:
   means for providing the network adapter with information that one partition of the multiple partitions of the processing system is to function as a router, wherein the multiple partitions of the processing system couple to the at least one network across the network adapter; and
   means for using the information at the network adapter to automatically forward data received across the network to the one partition, wherein the forwarding occurs without internet protocol (IP) processing between the network adapter and the one partition.

13. The system of claim 12, wherein the means for using comprises means for forwarding the data without the network adapter building a router table to exchange routing information before forwarding the data to the partition.

14. The system of claim 13, wherein the partition comprises a first partition, and wherein the means for providing comprises means for forwarding from each partition of the multiple partitions a HOME IP address for use by the adapter in forwarding data thereto, and wherein said means for using comprises means for automatically forwarding the data received across the network to the first partition when the data is not identified as destined for a HOME IP address registered to the network adapter.

15. The system of claim 14, wherein the network comprises a first network, and the communications environment includes a second network, with the first partition being coupled to both the first network and the second network and comprising a next hop router for forwarding data packets from the first network to the second network.

16. The system of claim 12, wherein said means for providing comprises means for employing a Set Router command from the partition to set a routing flag at the network adapter indicating that the partition of the processing system is to function as router for unregistered data packets received at the network adapter.

17. The system of claim 16, wherein said means for providing further comprises means for acknowledging back to the partition setting of the routing flag at the network adapter.

18. The system of claim 12, wherein the partition comprises a first partition, and wherein said information designates said first partition as a primary router, and said means for providing further comprises means for providing the network adapter with information that a second partition of the processing system is to function as a secondary router, wherein the secondary router is employed if the primary router fails.

19. The system of claim 12, wherein the at least one network comprises at least two networks, and wherein the partition functions as a router to route said data received across a first network to a second network of said at least two networks.

20. The system of claim 12, wherein said means for providing comprises means for providing said information from the partition to the network adapter at initialization of the processing system.

21. The system of claim 12, wherein said means for using comprises means for using the information at the network adapter to automatically forward unregistered data received across the network to the partition, wherein the automatic forwarding occurs without internet protocol (IP) processing between the partition and the network adapter.

22. The system of claim 21, wherein said means for providing comprises means for automatically communicating said information from the partition to the network adapter.

23. A system for routing data in a communications environment having at least one network and a processing system coupled thereto, said processing system having multiple partitions, said system comprising:
a partition of the multiple partitions of the processing system being adapted to function as a routing node; and
a network adapter coupled between the processing system and the at least one network for facilitating data transfer therebetween, said network adapter containing a routing flag indicating that said partition is to function as routing node for any unregistered data packets received at the network adapter from the at least one network.

24. At least one program storage device readable by a machine tangibly embodying at least one program of instructions executable by the machine to perform a method of routing data in a communications environment comprising at least one network and a processing system coupled thereto across a network adapter, said processing system having multiple partitions, said method comprising:

providing the network adapter with information that one partition of the multiple partitions of the processing system is to function as a router, wherein the multiple partitions of the processing system couple to the at least one network across the network adapter; and
using the information at the network adapter to automatically forward data received across the network to the one partition, wherein the forwarding occurs without internet protocol (IP) processing between the one partition and the network adapter.

25. The at least one program storage device of claim 24, wherein the forwarding occurs without the network adapter building a router table to exchange routing information before forwarding the data to the partition.

26. The at least one program storage device of claim 25, wherein the partition comprises a first partition, and wherein the providing comprises forwarding from each partition of the multiple partitions a HOME IP address for use by the adapter in forwarding data thereto, and wherein said using comprises automatically forwarding the data received across the network to the first partition when the data is not identified as destined for a HOME IP address registered to the network adapter.

27. The at least one program storage device of claim 26, wherein the network comprises a first network, and the communications environment includes a second network, with the first partition being coupled to both the first network and the second network and comprising a next hop router for forwarding data packets from the first network to the second network.

28. The at least one program storage device of claim 24, wherein said providing comprises employing a Set Router command from the partition to set a routing flag at the network adapter indicating that the partition of the processing system is to function as router for unregistered data packets received at the network adapter.

29. The at least one program storage device of claim 28, wherein said providing further comprises acknowledging back to the partition setting of the routing flag at the network adapter.

30. The at least one program storage device of claim 24, wherein the partition comprises a first partition, and wherein said information designates said first partition as a primary router, and said providing further comprises providing the network adapter with information that a second partition of the processing system is to function as a secondary router, wherein the secondary router is employed if the primary router fails.

31. The at least one program storage device of claim 24, wherein the at least one network comprises at least two networks, and wherein the partition functions as a router to route said data received across a first network to a second network of said at least two networks.

32. The at least one program storage device of claim 24, wherein said providing comprises providing said information from the partition to the network adapter at initialization of the processing system.

33. The at least one program storage device of claim 24, wherein said using comprises using the information at the network adapter to automatically forward unregistered data received across the network to the partition, wherein the automatic forwarding occurs without internet protocol (IP) processing between the partition and the network adapter.

34. The at least one program storage device of claim 33, wherein said providing comprises automatically communicating said information from the partition to the network adapter.

* * * * *

UNITED STATES PATENT AND TRADEMARK OFFICE
CERTIFICATE OF CORRECTION

PATENT NO.    : 6,778,540 B1
DATED         : August 17, 2004
INVENTOR(S)   : Ratcliff et al.

It is certified that error appears in the above-identified patent and that said Letters Patent is hereby corrected as shown below:

Column 5,
Line 11, delete the letter "m"

Signed and Sealed this

Twenty-eighth Day of September, 2004

JON W. DUDAS
*Director of the United States Patent and Trademark Office*